Nov. 25, 1952  L. C. WEST  2,619,134
GAUGE ATTACHMENT FOR SAW MACHINES
Filed Oct. 12, 1950  3 Sheets-Sheet 1

Inventor
Leonard C. West
By *Clarence A. O'Brien and Harvey B. Jacobson*
Attorneys

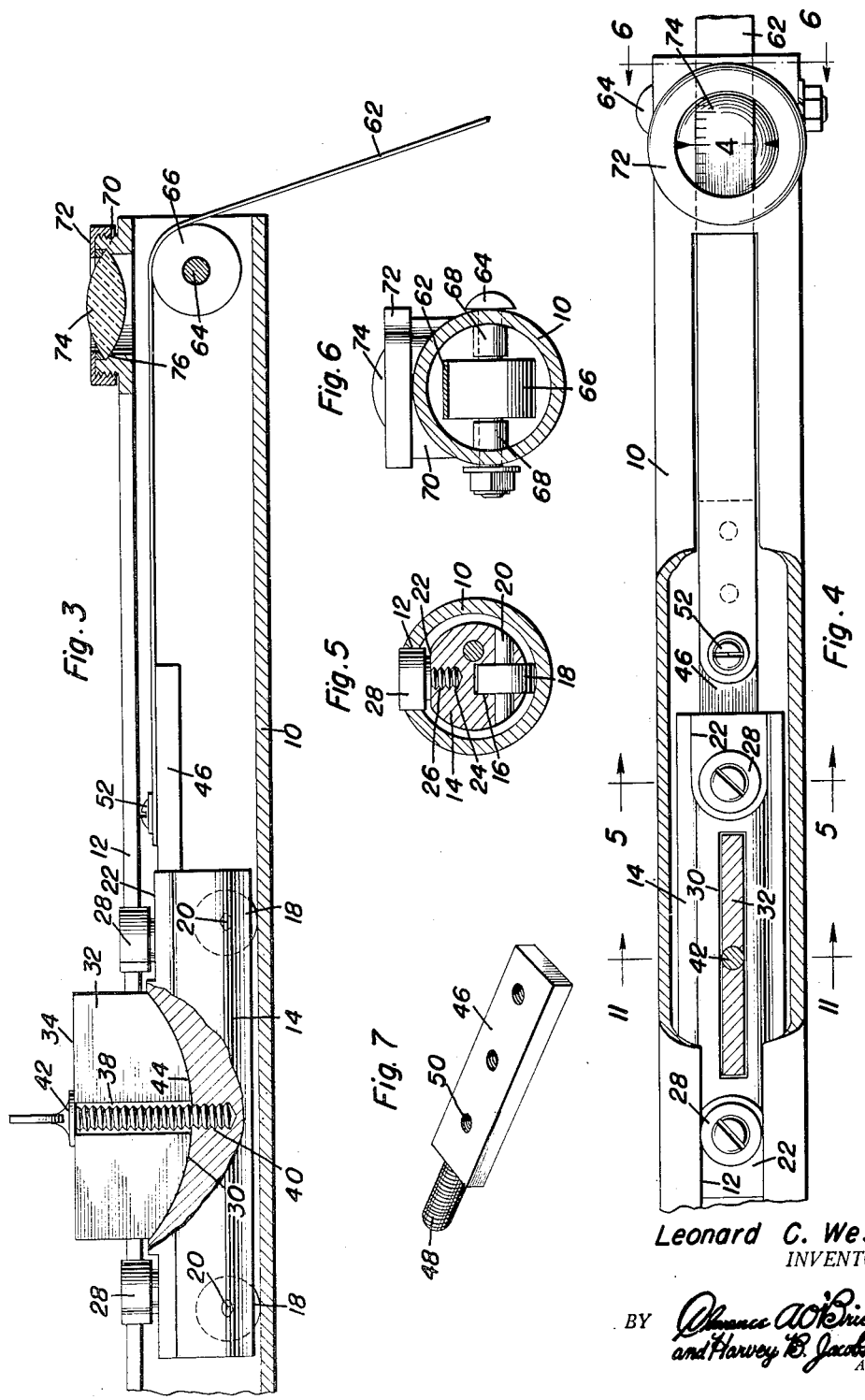

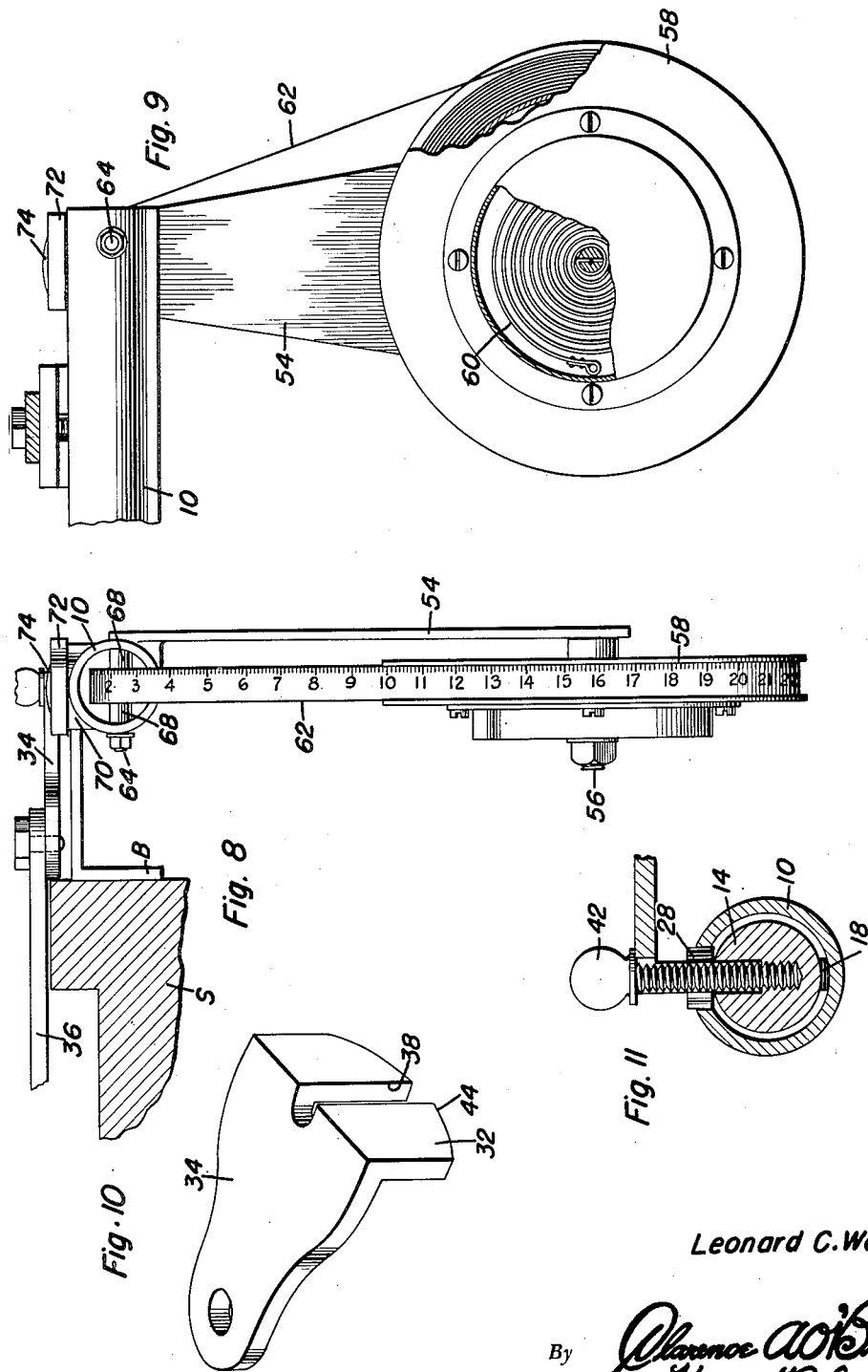

Patented Nov. 25, 1952

2,619,134

UNITED STATES PATENT OFFICE 2,619,134

GAUGE ATTACHMENT FOR SAW MACHINES

Leonard C. West, Newell, S. Dak.

Application October 12, 1950, Serial No. 189,816

7 Claims. (Cl. 143—174)

1

This invention relates to new and useful improvements in saw machines and the primary object of the present invention is to provide a gauge for saw machines that is actuated by a board slidably positioned on a saw machine to indicate the length of the board that will be cut by the saw blade.

Another important object of the present invention is to provide a gauge for saw machines and the like consisting of a tape spool and guide that are held stationary on the bed of a saw machine and a carriage slidably received in the guide and attached to one end of a tape on the spool so that the tape will unwind from the spool as the carriage is moved through the guide by a board placed on the machine whereby the length of the board that is to be cut will be indicated by the tape.

A further object of the present invention is to provide a board gauging attachment for saw machines that is quickly and readily mounted on a machine in a convenient manner without interfering with the normal use of the machine.

A still further aim of the present invention is to provide a gauge attachment for saw machines that is simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged fragmentary longitudinal and vertical sectional view of the present invention and showing the carriage partially in section and partially in elevation;

Figure 4 is a plan view of Figure 3 and with parts broken away from the convenience of description;

Figure 5 is a transverse sectional view taken substantially on the plane of section line 5—5 of Figure 4;

Figure 6 is a transverse sectional view taken substantially on the plane of section line 6—6 of Figure 4;

Figure 7 is a perspective view of the tape holding block used in the present invention;

2

Figure 1:
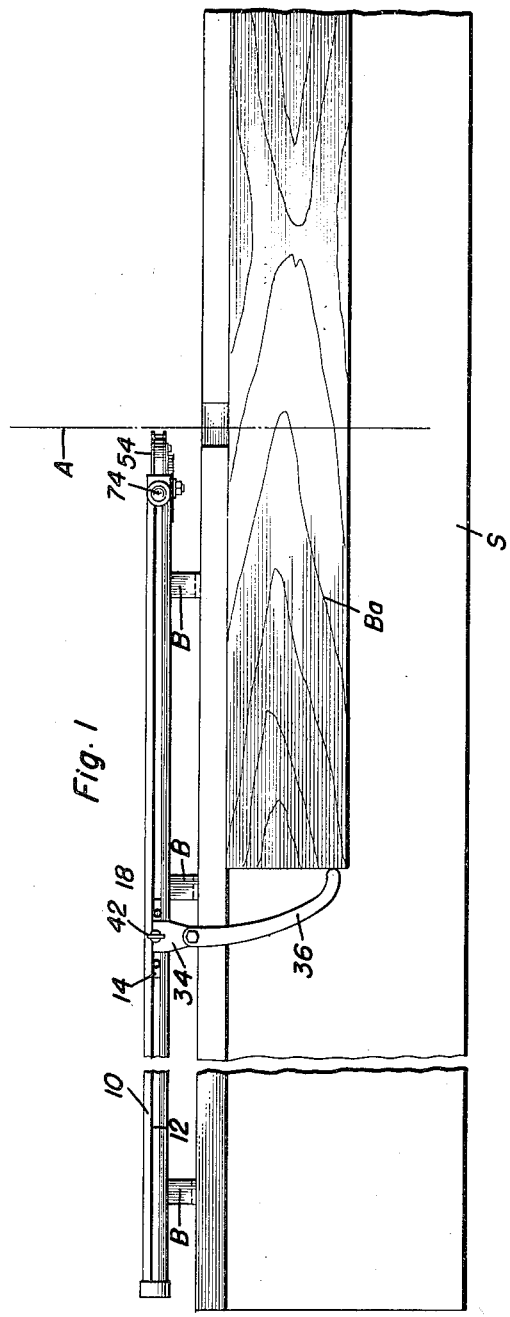
Figure 1 is a top plan view of a saw machine bed and showing the present invention mounted thereon and in use for measuring the length of board section that is to be cut from a board.
Figure 2:
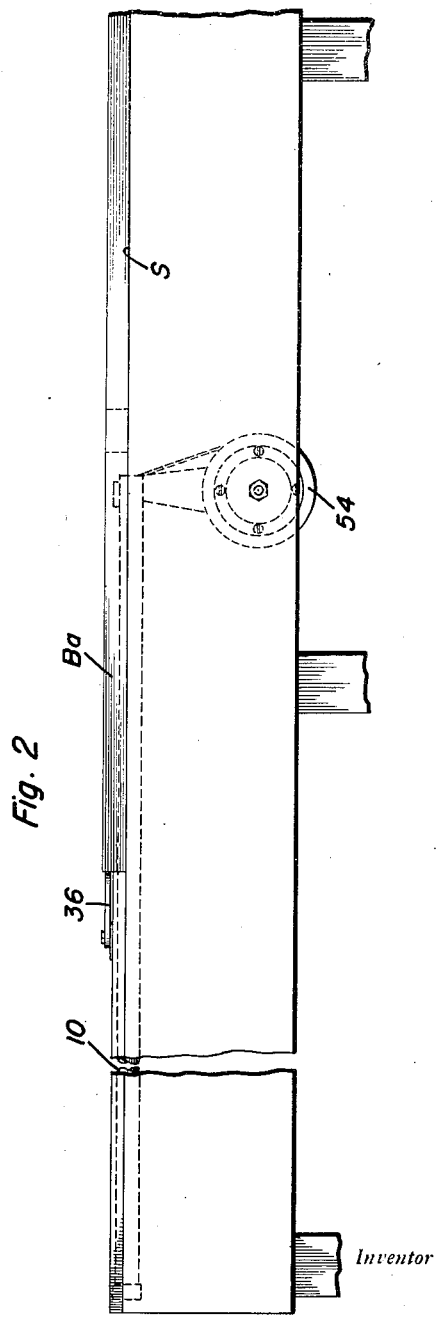
Figure 2 is a front elevational view of Figure 1.

Figure 8 is an enlarged vertical sectional view through the saw machine bed of Figure 1 and looking at one end of the present invention;

Figure 9 is a bottom plan view of Figure 8, and with parts of the tape holder broken away;

Figure 10 is a perspective view of the inner section of the contact arm used in the present invention; and, Figure 11 is a transverse sectional view taken substantially on the plane of section line 11—11.

Referring now to the drawings in detail, wherein for the purpose of illustration, there is disclosed a preferred embodiment of the present invention, the numeral 10 represents an elongated tubular guide track having a longitudinal slot 12 therein. A cylindrical carriage 14 is slidably received in the guide track 10 and this carriage is formed with a plurality of recesses 16 that receive guide rollers 18.

The guide rollers 18 are retained in the recesses 16 by pins 20 that extend through the rollers 18 and the carriage 14, and the rollers 18 ride against the inner periphery of the guide track 10 to space the cylindrical wall of the carriage from the inner walls of the guide track. The ends of the carriage 14 are provided with flattened portions or surfaces 22 having threaded apertures 24 that are disposed radially of the carriage to receivably engage the threaded shanks 26 of rollers 28. The rollers 28 ride against the edges of the slot 12 to prevent rotation of the carriage within the guide track and to aid in centering the carriage within the guide track.

The carriage 14 is provided with a concave recess 30 intermediate its ends that receives the flanged portion 32 of the inner section 34 of a contact arm 36. The flanged portion 32 is formed with a slot 38 that communicates with a threaded bore 40 in the carriage 14. The flanged portion 32 extends through the slot 12 and the recess 30 registers with the slot 12. The threaded shank of a headed bolt 42 extends through the slot 38 and is threaded in the bore 40 to secure the section 34 to the carriage 14. The flanged portion 32 is provided with a convex edge 44 that seats against the concave wall of the recess 30.

A tape holding block 46 is secured to the carriage 14 and includes a threaded shank 48 that is threaded in a longitudinal recess in one end of the carriage 14. The block 46 is provided with a plurality of longitudinally spaced apertures 50 for selectively receiving a fastener or screw 52.

A supporting arm 54 is suitably secured to and projects laterally from one end of the guide track 10 and supports a depending rod 56 on which there is rotatably mounted a tape reel or spool

58. The spool 58 is tensioned by a spring 60 so that as the tape 62 is unwound from the spool 58, the spring 60 will be tensioned tending to rewind the tape on the spool.

The spool 58 is disposed at one end of the guide track and the tape extends through the guide track and is attached to the block 48 by the screw 52. The screw 52 extends through the tape and into one of the apertures 50. A horizontal bolt 64 extends through the end of the guide track supporting the arm 54 and rotatably supports a roller or spool 66 against and over which the tape 62 is trained. Spacer sleeves 68 on the bolt 64 retain the roller 66 centered in the guide track.

An externally threaded sleeve 70 projects laterally from the guide track 10 in registry with the roller 66 and receives an apertured cap 72 that retains a magnifying glass or concave-convex lens 74 against a shoulder 76 on the inner periphery of the sleeve 70 whereby the indicia or scale on the tape 62 may be easily viewed.

In practical use of the present invention the guide track 10 is mounted longitudinally of a saw bed S by mounting brackets B with the spool 54 disposed adjacent the path of the saw indicated by sectional arrow A. The contact arm 36 is so located as to be engaged by a board Ba as the latter is moved against the saw bed.

As the board Ba is moved a predetermined distance, carrying the carriage 14 with it, the operator will observe the tape 62 through the glass 74. Upon reading the desired length on the tape, the travel of the board is arrested and the saw blade moved to cut the board at a known length.

Having described the invention, what is claimed as new is:

1. In a saw machine including a longitudinal bed adapted to slidably receive boards and a saw blade disposed transversely of the bed, means for indicating the length of a board from one end of the board to the blade, said means comprising a guide track, means for mounting the guide track on the bed and retaining the guide track parallel to the bed, a carriage slidably received in the guide track, an abutment carried by the carriage and overlying the bed to be engaged by a board sliding upon the bed, a tape supported on the guide track and having one end secured to said carriage, a spring tensioned spool carried by the guide track about which said tape is wound.

2. In a saw machine including a longitudinal bed adapted to slidably receive boards and a saw blade disposed transversely of the bed, means for indicating the length of a board from one end of the board to the blade, said means comprising a guide track, means for mounting the guide track on the bed and retaining the guide track parallel to the bed, a carriage slidably received in the guide track, an abutment carried by the carriage and overlying the bed to be engaged by a board sliding upon the bed, said guide track having a longitudinal slot therein, rollers carried by the carriage riding against the edges defining the slot, and a flexible graduated tape supported on the guide track and having an end attached to said carriage and located within the guide track.

3. In a saw machine including a longitudinal bed adapted to slidably receive boards and a saw blade disposed transversely of the bed, means for indicating the length of a board from one end of the board to the blade, said means comprising a guide track, means for mounting the guide track on the bed and retaining the guide track parallel to the bed, a carriage slidably received in the guide track, an abutment carried by the carriage and projecting laterally from the guide track and overlying the bed to be engaged by a board sliding upon the bed, a tape supported on one end of said guide track and disposed adjacent the saw blade, said tape having an end entering the guide track and attached to the carriage, a roller within the guide track adjacent the end thereof supporting the tape, said tape extending over the roller, and a magnifying glass mounted on the guide track and overlying the tape and the roller.

4. In a saw machine including a longitudinal bed adapted to slidably receive boards and a saw blade disposed transversely of the bed, means for indicating the length of a board from one end of the board to the blade, said means comprising a guide track, means for mounting the guide track on the bed and retaining the guide track parallel to the bed, a carriage slidably received in the guide track, an abutment carried by the carriage and projecting laterally from the guide track and overlying the bed to be engaged by a board sliding upon the bed, a block having a threaded shank secured to said carriage and located in said guide track, said block having a plurality of longitudinally disposed apertures therein, a tape support at one end of the guide track and including an end overlying the block, and a fastener securing the said end of the tape to the block, said fastener being threaded in a selected one of said apertures.

5. A gauging attachment for saw machines comprising an elongated tubular guide having a longitudinal slot, a cylindrical carriage received in said guide for sliding movement, rollers carried by said carriage riding against the inner periphery of said guide, additional rollers carried by the carriage riding against the edges defining said slot, a contact arm attached to said carriage and extending outwardly from the guide, a spring tensioned roller mounted at one end of said guide and having a tape wound thereon, said tape having an end attached to said carriage, and a magnifying glass supported on the guide and extending across the slot and the tape.

6. A gauging attachment for saw machines comprising an elongated tubular guide having a longitudinal slot, a cylindrical carriage received in said guide for sliding movement, rollers carried by said carriage riding against the inner periphery of said guide, additional rollers carried by the carriage riding against the edges defining said slot, a contact arm attached to said carriage and extending outwardly from the guide, a spring tensioned roller mounted at one end of said guide and having a tape wound thereon, said tape having an end attached to said carriage, said carriage having a recess therein in registry with said slot, said arm including an inner section having a flange slidably received in said slot and seated in said recess, and a fastener carried by the inner section and threaded to the carriage to retain the flange in the recess.

7. A gauging attachment for saw machines comprising an elongated tubular guide having a longitudinal slot, a cylindrical carriage received in said guide for sliding movement, rollers carried by said carriage riding against the inner periphery of said guide, additional rollers carried by the carriage riding against the edges defining said slot, a contact arm attached to said carriage and extending outwardly from the guide, a spring tensioned roller mounted at one end of said guide and having a tape wound thereon, said tape having an end attached to said carriage, a block having a threaded shank attached to one end of said carriage, said block having a plurality of longitudinally displaced apertures, the said end of said tape overlying the block, a screw extending through the said end of said tape and being threaded in a selected aperture, and a spool mounted in the guide over which the tape is trained.

LEONARD C. WEST.

REFERENCES CITED

The following references are of record in the file of this patent:

UNITED STATES PATENTS

| Number | Name | Date |
| --- | --- | --- |
| 305,563 | Baer | Sept. 23, 1884 |
| 1,202,768 | Arnold | Oct. 31, 1916 |
| 1,459,873 | Blackburn | June 26, 1923 |